United States Patent [19]

Lanmon, II

[11] Patent Number: 4,718,487
[45] Date of Patent: Jan. 12, 1988

[54] AUXILIARY WELL PRESSURE PACKOFF ASSEMBLY

[75] Inventor: C. P. Lanmon, II, Houston, Tex.

[73] Assignee: Hydrolex, Inc., Longview, Tex.

[21] Appl. No.: 846,132

[22] Filed: Mar. 31, 1986

[51] Int. Cl.⁴ .......................................... E21B 33/02
[52] U.S. Cl. ...................................... 166/82; 166/84; 166/93; 277/73; 277/103; 277/112
[58] Field of Search ...................... 166/85, 86, 88, 89, 166/93, 82, 379, 385, 77, 70, 65.1, 84, 82; 174/65 SS; 277/102, 103, 110, 112, 117, 105, 44, 66, 73, 75; 285/101, 107, 338, 348, 196, 96, 139, 102, 106, 83, 143

[56] References Cited

U.S. PATENT DOCUMENTS

| | | | |
|---|---|---|---|
| 1,623,403 | 4/1927 | Friel | 277/66 |
| 2,684,118 | 7/1954 | Osmun | 166/70 |
| 2,689,611 | 9/1954 | Martinson | 166/85 |
| 2,943,682 | 7/1960 | Ingram, Jr. et al. | 166/77 |
| 3,228,703 | 1/1966 | Wilson | 277/73 |
| 3,653,671 | 4/1972 | Shipes | 277/103 |
| 4,327,804 | 5/1982 | Reed | 166/97 |
| 4,489,916 | 12/1984 | Stevens | 277/112 X |

FOREIGN PATENT DOCUMENTS 504521 4/1939 United Kingdom ............... 277/112

Primary Examiner—James A. Leppink
Assistant Examiner—Hoang C. Dang
Attorney, Agent, or Firm—Gunn, Lee & Jackson

[57] ABSTRACT

An auxiliary well pressure packoff assembly for wireline control valves is positionable within the downstream passage of a wireline valve body without requiring cutting of the wireline and receives the wireline in surrounded, sealed relation. A retainer closure positively retains the packing assembly within the valve body passage. An externally controllable mechanism is provided to displace resilient sealing material of the packing assembly to enhance the sealing relationship thereof with the wireline and valve body passage, thus providing an auxiliary seal to protect workers from hazards in the event well pressure should leak past the wireline control valve mechanism. The packoff assembly also clamps the cable to prevent it from moving and vents any leaked well pressure to a safe location. An automatic pressure activated self-energizing feature is provided which increases sealing capability of the system in proportion to increase in well pressure.

22 Claims, 6 Drawing Figures

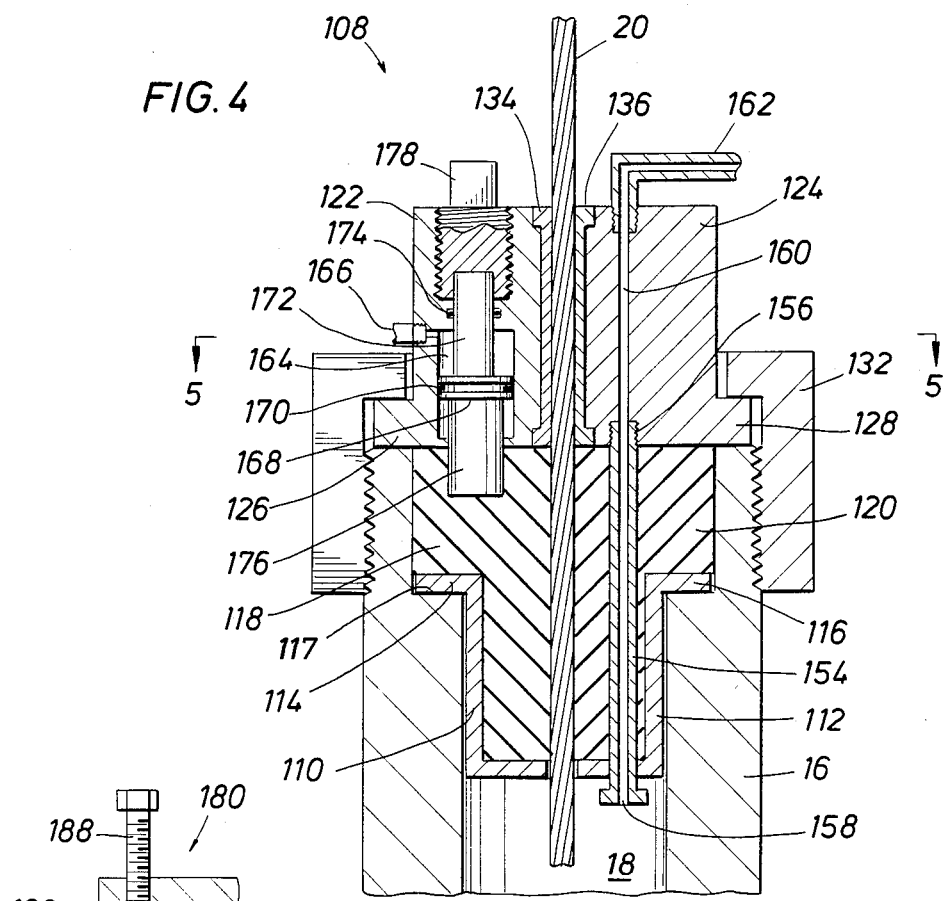
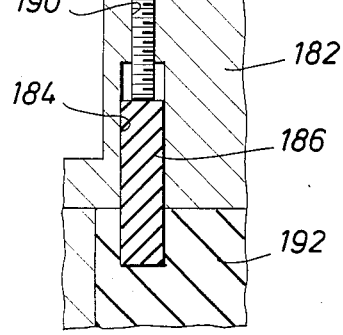
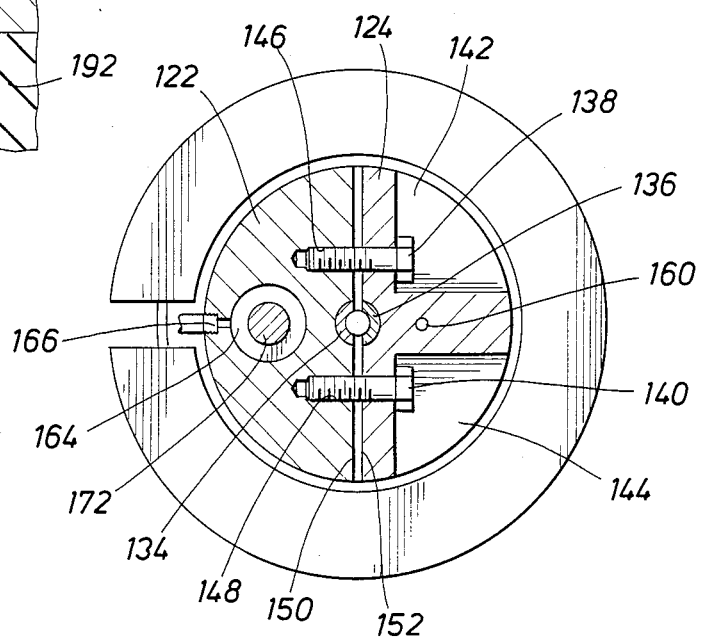

AUXILIARY WELL PRESSURE PACKOFF ASSEMBLY

FIELD OF THE INVENTION

This invention relates generally to wireline service equipment for the downhole servicing of wells and, more particularly, is directed to an auxiliary pressure packoff assembly for wireline control valves which provides positive protection to workers against the hazards resulting from leaking high pressure fluid in the event a wireline valve should develop leakage in its closed condition.

BACKGROUND OF THE INVENTION

After wells have been drilled and placed in production and, in some cases, during drilling operations, it is necessary to conduct electric logs and/or perform downhole servicing of well equipment. In many cases, the downhole equipment is designed for servicing by means of various tools which are lowered into the well on a wireline. Wireline servicing is a significantly inexpensive servicing operation as compared to the cost of removing production tubing and equipment from the well for servicing.

Wireline servicing operations are performed inside oil and gas wells while the wells are maintained under pressure. The cable and tools are introduced into the pressurized well, using well known wireline pressure control equipment and techniques. One necessary part of wireline servicing equipment is a wireline control valve which is also referred to as a blowout preventer. The wireline control valve is used to center the wireline cable and seal around the motionless wireline cable to allow the upper parts of the control equipment to be depressurized and removed for repair of the wireline or control equipment. For example, a strand of cable armor can break and jam inside the pressure control lubricator pipe, preventing the cable from being withdrawn from the well. To make repairs, the wireline valve is closed around the cable to form a seal and the pressure above the wireline valve is vented. The union above the wireline valve is then unscrewed and the lubricator is raised and the cable is clamped to keep it from falling downhole. After this has been accomplished, the repair work can begin. This repair work must be done by workers working directly over the wireline valve opening, or very nearby. In the event the wireline valve should begin to leak around the cable after the union has been unscrewed, the safety of the workers will be in serious jeopardy. It is a matter of record that it is difficult to obtain and maintain a seal around the armored type, wireline cable, since well fluids can migrate between the inner and outer layers of the cable armor. There is, therefore, a need for an auxiliary cable seal, means for diverting leaking fluids to a safe location, and means for clamping the cable. Moreover, it is necessary that the wireline servicing device be capable of installation without necessitating cutting of the cable.

SUMMARY OF THE INVENTION

It is, therefore, a primary feature of the present invention to provide a novel, auxiliary pressure packoff mechanism which provides an automatically self-energizing pressure activated seal between the wireline and the upper union of a closed wireline valve.

It is also a feature of this invention to provide a novel auxiliary pressure packoff mechanism which provides an auxiliary cable seal downstream of the wireline valve, which seal is enhanced by well pressure upstream thereof.

It is another feature of this invention to provide a novel auxiliary pressure packoff mechanism for wireline service equipment which incorporates means for diverting leaking pressure and fluids from the well head to a safe location to thereby provide additional protection for workers in the vicinity of the equipment.

It is an even further feature of this invention to provide a novel auxiliary pressure packoff mechanism incorporating an effective system for positively clamping the cable and thus minimizing the possibility of wire line cable movement.

It is an even further feature of this invention to provide a novel auxiliary pressure packoff mechanism which is capable of being simply and efficiently installed without necessitating cutting of the wireline cable.

Briefly, the invention is set forth herein in the form of three possible embodiments, each being capable of accomplishing efficient cable sealing in accordance with a desired procedure. Each of these three embodiments is capable of being placed in the open upper half-union of a conventional wireline valve. In each case, a resilient body is defined by two half-sections, typically of generally cylindrical crosssectional configuration, the half-section bodies being formed of a resilient material, such as any one of a number of suitable elastomeric materials that are commercially available and which have the capability of withstanding any adverse chemical effect of the well fluid being controlled. The resilient half-sections cooperate to form a centralized passage through which the wireline extends. The resilient sections are assembled in abutting relation about the wireline and are then moved downwardly and firmly seated within the outlet passage of the wireline valve body. The half-sections of resilient material are each supported by a lower retaining body which is also formed by half-sections for assembly about the wireline. The half-sections of the lower retaining body cooperate to form a circular supporting flange for the resilient seal. An upper retaining body structure is adapted to form a closure for the upper end of the wireline valve body. The upper retaining body is also in the form of interfitting half-sections in order that it may be assembled about the wireline cable. The upper retaining body structure is also provided with a cable clamp, adapting the cable to be mechanically clamped to thus provide an additional safety feature. The upper retaining body structure is secured to the upper end of the wireline body by means of a union nut which is slotted to enable it to be moved transversely into assembly with the cable. The slotted union nut bears against flanges of the upper retaining body halves to thus secure them in positive abutment with the upper extremity of the wireline valve body.

One of the half-sections of the lower retaining body half, the resilient sealing body and the upper retaining body half cooperate to form a vent passage extending from the passage of the wireline valve body. This vent passage is in communication with a conduit which conducts pressurized fluid that might leak past the wireline valve to a location of safety. The vent conduit or passage may contain a pressure gauge for visual indication that leakage may have occurred and it may also contain a control valve providing valve control capability for the vent passage. Any vented pressure or fluid may be vented to the atmosphere if desired, or it may be conducted to a suitable reservoir for its containment.

For the purpose of sealing the elastomeric sealing body about the wireline cable and also for sealing against the inner surfaces of the wireline valve body, the wireline pressure packoff and flow diverter incorporate means for physically displacing the elastomeric sealing material of the sealing body. A seal displacement member is capable of being forced into the body of the elastomeric sealing material such as by mechanical actuation, hydraulic actuation or by any other suitable means. As mechanical displacement of the elastomeric sealing body occurs, the mechanical pressure of sealing body against the wireline cable and the inner surfaces of the wireline valve body will be mechanically increased until a sealing capability is established.

The embodiment in FIGS. 1-3 disclosed hereof employs well pressure to automatically increase the displacement of the elastomeric sealing material thus providing a self-energizing seal against the wireline cable and the inner surfaces of the wireline valve body. In this case, it is not necessary to develop mechanically induced sealing of sufficient magnitude to withstand high pressure conditions of the well. It is only necessary to induce material stress by displacement sufficiently to begin the automatic self-sealing activity. Thereafter increase in fluid pressure acting on the packoff assembly will result in increased sealing capability producing a stress in the sealing material that is higher than the pressure being sealed.

The sealing capability of the elastomeric sealing body may also be induced by simply reducing the axial length of the sealing body through application of mechanical force to one or both axial extremities thereof. This causes the sealing body to expand forming a seal with respect to the internal surfaces of the wireline valve body and also causes the resilient sealing material to establish tight sealing engagement with the wireline cable and vent tube extending therethrough.

To start the action of pressure enhanced self-sealing capability, a mechanically enhanced additional sealing capability is established under simple and efficient control by workers utilizing the equipment. For example, depending on the character of the packoff assembly, seal displacement may be induced by mechanical apparatus, hydraulic apparatus, etc.

Other and further objects, advantages and features of the present invention will become apparent to one skilled in the art upon consideration of the written specification, the attached claims and the annexed drawings. The form of the invention which will now be described in detail, illustrates the general principles of the invention, but it is to be understood that this detailed description is not to be taken as limiting the scope of the present invention.

BRIEF DESCRIPTION OF THE DRAWINGS

So that the manner in which the above recited features advantages and objects of the present invention as well as others which will become apparent are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of this invention and are, therefore, not to be considered limiting of its scope, for the invention may admit to other equally effective embodiments.

In the Drawings

FIG. 1 is a partial sectional view of the upper portion of a wireline valve body showing a wireline pressure packoff and flow diverter mechanism constructed in accordance with the present invention in operative sealed assembly within the wireline valve body passage.

FIG. 2 is a sectional view, taken along line 2—2 of FIG. 1.

FIG. 3 is a sectional view, taken along line 3—3 of FIG. 1.

FIG. 4 is a sectional view of the upper portion of a wireline valve body having a wireline pressure packoff and flow diverter device installed therein which represents an alternative embodiment of this invention.

FIG. 5 is a sectional view taken along line 5—5 of FIG. 4.

FIG. 6 is a fragmentary sectional view of a wireline pressure packoff and flow diverter mechanism representing a further embodiment of this invention.

DETAILED DESCRIPTION OF PREFERRED EMBODIMENTS

Figure 1:
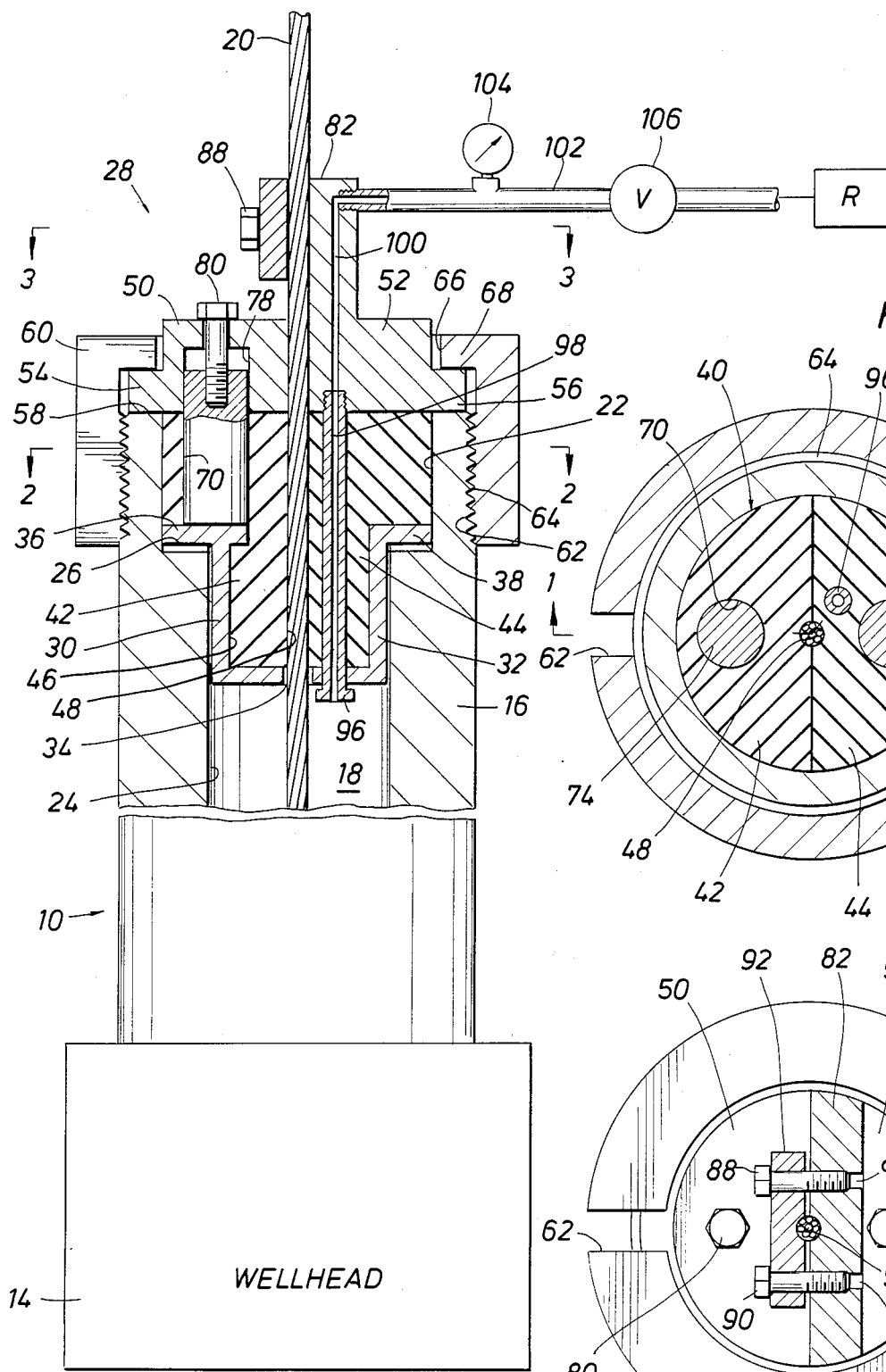

Referring now to the drawings, and first to FIG. 1, a wireline valve body is illustrated generally at 10 that is in turn assembled to a wellhead structure, 14. A section of lubricator pipe will be placed above the wireline valve body but is not shown. The wellhead structure is illustrated schematically since it forms no part of the present invention, but rather illustrates the location of the invention in relation to components typically assembled for wireline type downhole servicing of the well. The wireline valve body, 10, includes an upper extremity, 16, which is of tubular form defining a flow passage, 18, in registry with the flow passage of the well. The wireline valve is capable of establishing a sealed relationship with the wireline cable, 20, extending therethrough. At its upper extremity, the wireline valve tube, 16, is enlarged internally to form a generally cylindrical surface, 22, of larger diameter than the diameter of the surface, 24, forming a part of the flow passage, 18, of the wireline valve. The packoff seal will be developed between the surface 22 and the cable 20.

Since it is desirable that the pressure packoff assembly be capable of assembly about the wireline, 20, without requiring cutting of the wireline, each of the structural components of the pressure packoff assembly are in the form of half-sections which are capable of assembly about the wireline. To provide for structural support within the wireline valve body, a lower retaining body structure is formed by retaining body halves, 30 and 32, which cooperate when in assembly to form a central aperture, 34, through which the wireline, 20, extends. The lower retaining body halves, 30 and 32, also form upper flange halves, 36 and 38 which are in spaced relation with a stop shoulder 26 in the sealed condition of the apparatus.

Sealing about the wireline cable, 20, is established by means of a body of resilient sealing material, such as rubber or any one of a number of suitable elastomeric materials. The resilient sealing body shown generally at 40, is defined by sealing body halves, 42 and 44, which cooperate to substantially fill the packing chamber formed by the upper cylindrical surface, 22, of the wireline valve body and a lower cylindrical surface, 46, formed cooperatively by the lower retaining body halves, 30 and 32. The sealing body halves, 42 and 44, also cooperate to form an axial passage, 48, through which the wireline cable, 20, extends. Since the wireline cable is typically of multistrand, helically wound character, it is necessary that the resilient material be capable of establishing sealing conformation to the surface irregularities of the cable. This can be accomplished by mechanically deforming the body of resilient material sufficiently to cause it to establish tight sealing engagement, not only with the cable but also with the cylindrical surfaces, 22 and 46, as well as other surfaces against which sealing engagement is necessary.

The upper extremity of the wireline valve body is closed by means of a sealed retaining closure formed by upper retaining body halves, 50 and 52. The body halves, 50 and 52, form half flanges, 54 and 56, which are secured to the end surface, 58, of the wireline valve body by means of a retainer nut, 60. The retainer nut defines internal threads, 62, which receive the externally threaded portion, 64, of the wireline valve body. The retainer nut, or union nut, 60, is slotted as shown at 62, forming an opening allowing the union nut to be placed about the wireline without requiring the wireline to be cut. The upper portion of the union nut, 60, defines a central opening, 66, through which the upper retaining body halves extend and also forms a circular flange, 68, which bears against the flange halves, 54 and 56, thus retaining them in positive, mechanically secured assembly with the upper end portion of the wireline valve body.

As mentioned above, it is desirable to mechanically deform the body of resilient sealing material, thus allowing the development of sealing engagement with the various internal surfaces of the packing chamber. In accordance with the embodiment of FIGS. 1-3, each of the resilient body halves defines cylindrical passages, 70 and 72. Elongated tension members, 74 and 76, are secured at the lower extremities thereof to the upper flange portions, 36 and 38, of the lower retaining body halves, and extend upwardly through the respective passages, 70 and 72. The upper portions of the tension members are received respectively within appropriate receptacles, 78, formed in each of the retainer body halves. Bolts, 80, extend through apertures formed in the upper retaining body halves and are threadedly received by the tension members. Upon appropriate rotation of the bolts, 80, tension force will be applied through the tension members to the upper flanges, 36 and 38, of the lower retaining body halves, thus forcing them upwardly. Since the closure member formed by the upper retaining body halves, 50 and 52, prevents upward displacement of the resilient body, the resilient body will simply be compressed between the upper and lower retaining body halves. Displacement of the resilient sealing body halves in this manner causes tight sealing compression of the sealing material against all internal surfaces, including the surface of the wireline cable, 20.

It should be borne in mind that the bolts, 80, are adjusted to draw the lower retaining body halves upwardly only sufficiently to establish an initial seal by mechanical energization of the resilient sealing material of the sealing body halves to develop initial sealing stress in the sealing material. It should also be borne in mind that the receptacles 78 are exposed to atmospheric pressure via the bolt aperture. As well pressure builds up in the passage, 18, below the lower retaining body halves, it will act on the entire lower surface area of the sealing body, tending to force the sealing material upwardly against the lower surface of the upper retaining body halves. Since the bolts, 80, will have been tightened only sufficiently tight to cause the sealing material to establish an initial seal only, well pressure energization of the resilient material causes increased stress in the sealing material resulting in its additional deformation or "squeezing" against all internal surfaces of the packoff assembly. This will cause the bolts to be forced upwardly, sliding through their respective apertures. The net effect of this movement is simply an increase in the sealing capability of the elastomeric sealing material responsive to the increase in well pressure with the sealing stress of the resilient material always exceeding the well pressure. Upon dissipation of pressure below the lower retaining body halves, energization of the elastomeric sealing material will diminish, thereby allowing the bolts, 80, to be moved downwardly to the position shown in FIG. 1. After this has occurred, the resilient sealing material returns to its prestressed condition and thus will again be maintained at its initial sealing capability. When pressure builds up beneath the pressure packoff assembly, therefore, the trapped pressure will act against the entire area of the lower retainer body. Thus, an upward acting force is produced that must be resisted by an equal and opposite force acting in a downward direction. It will be shown that these forces produce a compressive stress in the resilient sealing material which is higher than the pressure being sealed. Thus, the seal affected is self-energizing and will seal any pressure provided the initial compressive stress of the resilient sealing material is sufficient to develop an initial seal with both the wireline and valve body.

An analysis of the forces present to produce the automatically adjusting compressive pressure in the resilient material is as follows:
Where:
  PW=Well Pressure to be sealed
  PR=Pressure or stress in Rubber
  AS=Area of Wireline Valve Union Sealing Surface (surface 22)
  AC=Cross-sectional Area of Cable (20)
  AP=Combined cross-sectional Area of Tension Pistons (74, 76)

Forces acting upward on any body at rest must equal forces acting downward. Consider the vertical forces on the Seal 42/44.

$$PW(AS - AC) = PR(AS - AC - AP)$$

$$PR = \frac{PW(AS - AC)}{(AS - AC - AP)}$$

Therefore, PR will always be greater than PW. For example:
Set:
  Diameter of Seal=3.75 square inches
  Diameter of Cable=2.2 square inches
  Diameter of Pistons=1.25 square inches
  PW=10,000 PSI
  AS=11.04 square inches
  AC=0.4 square inches
  AP=1.23×2=2.46 square inches
  10,000 (11.04−0.4)=PR (11.04−0.04−2.46)
  PR=12,880 PSI or
  PR=1.29 times PW The self-energized movement of the tension pistons, 74 and 76, upward negates the precompression applied.

However, when PW is reduced, the precompression will be reapplied as the bolts return to the original position as shown in FIG. 1.

It is desirable to secure the wireline cable to thus prevent its inadvertent movement through the package assembly and the wireline valve while the resilient sealing material is maintained in sealed engagement with the wireline cable as described above. For this reason, the upper retaining body half, 52, is provided with a cable clamp structure which allows the cable to be mechanically secured. The retaining body half, 52, defines and upstanding transverse bar or flange, 82, having threaded openings, 84 and 86, to receive the threads of cable clamp bolts, 88 and 90. The cable clamp bolts extend through openings formed in a clamp member, 92, and thus serve to draw the clamp member toward the transverse clamping flange, 82. The claming flange and the clamp, 92, each define generally semi-cylindrical grooves which corporate to form a clamping channel, 94, within which the wireline cable is received. The clamping channel is of such dimension relative to the dimension of the wireline cable that the cable will be securely clamped and locked against inadvertent movement, as the clamp member is brought into close proximity with the transverse clamping flange, 82.

It is desirable to provide means for venting any pressure accumulation between the lubricator and the pressure packoff mechanism. Accordingly, an elongated bleed tube, 96, extends through a passage formed through the lower retaining body half, 32, and the sealing body half, 44. The upper extremity of the bleed tube is received in threaded engagement with the upper retaining body half and defines a vent passage, 98, which is in fluid communication with a vent passage, 100, extending through the upper retaining body half, 52. A vent conduit, 102, in threaded engagement with the upstanding flange, 82, conducts any leaked fluid from the passage, 18, to any suitable remote location for release or disposal. The leaked fluid may be vented to the atmosphere or, if desired, it may be conducted to a reservoir shown schematically at R for its capture. The vent line, 102, may also incorporate a pressure gauge, 104, for identification of the pressure within the flow passage, 18, and a control valve, 106, to thus enable the workers to selectively vent the pressure as desired.

Since the wireline cable may be securely clamped and any pressure buildup below the pressure packoff can be vented to the atmosphere or to a capture reservoir, workers in the immediate vicinity of the equipment will have optimum safe working conditions.

INSTALLATION

Under circumstances where the wireline cable becomes jammed and cannot be withdrawn from the well, such as when a strand of cable armor breaks and jams inside the pressure control lubricator pipe above the wireline valve, repair is necessary. To make the repairs, the wireline valve is closed about the cable, thus establishing a seal with the cable. The pressure above the wireline valve is then vented and the union on the upper end of the wireline valve is unscrewed. The lubricator is then raised and the cable clamped to prevent it from moving downhole. The packoff is preassembled into two halves for rapid deployment when it is needed. One half consists of parts 52, 44, 96, 32, 76 and 80; the other 50, 42, 74, 30 and 80. The clamp 92 and bolts 88 and 90 are separate. The two preassembled halves are placed around the cable and into the wireline valve body 22.

Figure 2:
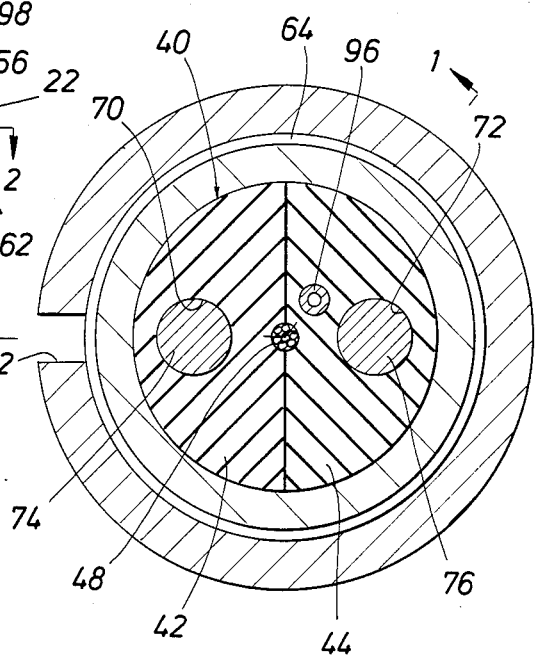
Figure 3:
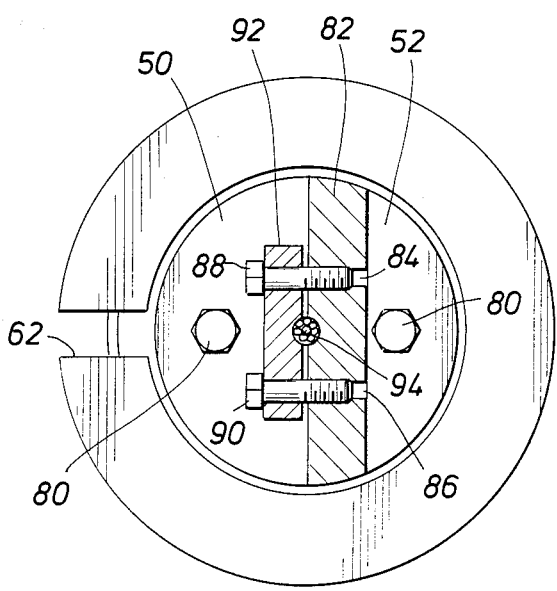

The slotted nut 60 is placed around the cable and tightened to the thread 64. The clamp 92 is placed around the cable and the clamping bolts, 88 and 90, are tightened to secure the cable against inadvertent movement. The seal energizing bolts 80 are then tightened sufficiently to draw the retaining body halves, 30 and 32, upwardly, thus displacing the sealing material sufficiently to establish an initial seal against all internal surfaces including the surface of the cable. When wireline valve leakage occurs, the passage, 18, below the pressure packoff assembly will increase to well pressure. Since the receptacles 78 for the tension pistons are under atmospheric pressure, a well pressure induced self-energizing activity will take place as indicated by the above example, placing the sealing material under sealing stress exceeding well pressure and thereby developing a pressure induced force subjecting the resilient sealing material to further sealing compression in direct proprotion to the well pressure involved. The sealing capability of the auxiliary pressure packoff assembly therefore increases as well pressure increases. To vent leakage past the wireline valve, the valve 106 can be opened, thereby venting the passage, 18, to the atmosphere or to a suitable reservoir. The mechanism of FIGS. 1-3 provides an effective seal between the wireline and the upper union of a closed wireline valve or blowout preventer. The mechanism provides an effective means to divert well fluids that might leak from the closed wireline valve to a safe remote location, thereby protecting workers against the hazards of wireline valve leakage. Further, the mechanism also provides a clamping system capable of suspending the weight of the wireline and the attached tools that are located below the wireline valve.

Referring now to FIGS. 4 and 5, an alternative embodiment of the present invention is disclosed generally at 108 which is capable of developing a seal within the upper extremity of a wireline valve body, 16, of similar construction to that shown in FIG. 1. Lower retaining body halves, 110 and 112, are provided which are receivable within the passage, 18, of the valve body and incorporate support flanges, 114 and 116, which are supported by an internal shoulder, 117. A pair of resilient sealing body sections, 118 and 120 are positioned within the passage, 18, about the wireline cable, 20.

A pair of upper retaining body halves, 122 and 124, define flange sections, 126 and 128, which are secured against the upper extremity of the wireline valve body, 16, by means of a slotted union nut, 132, similar to that shown at 60 in FIG. 1.

The upper retaining body halves, 122 and 124, define registering grooves which receive cable clamp segments, 134 and 136, which receive the cable, 20, in clamping engagement therewith. Clamping bolts, 138 and 140, are received in bolt recesses, 142 and 144 and have threaded engagement with internally threaded openings, 146 and 148, of the upper retaining body half, 122. The cable clamp segments are arranged such that when establishing tight clamping engagement with the cable, a condition of stand-off exists between surfaces 150 and 152 of the respective retaining body halves, as shown in FIG. 5. This feature allows the clamping bolts to be tightened until a securely clamped relationship is established between the cable clamp segments and the cable for support of the wireline extending downhole and the weight of the downhole tools supported by the wireline.

A vent tube, 154, extends through the resilient sealing body, 120, and the lower retaining body half, 112, and is provided with an externally threaded upper extremity, 156, which is received within an internally threaded aperture of the upper retaining body half, 124. The vent tube defines an internal passage, 158, which is in communication with a vent passage, 160, formed in the upper retaining body half, 124. A vent line, 162, is connected by threads or any other suitable means to the upper retaining body half, 124, and serves to conduct pressurized fluid from the passage, 18, to the atmosphere or to any other suitable facility. Essentially, the vent tube, 162, conducts fluid such as gas, oil, water, etc., leaked past the wireline valve to a remote location thereby enabling workers in the immediate vicinity of the auxiliary pressure packoff mechanism to be safe from the hazards of pressure.

For controlled displacement of the resilient sealing material forming the sealing body halves, 118 and 120, a hydraulically energized system is provided as shown in FIGS. 4 and 5. The upper retaining body half, 122, defines a piston chamber, 164, having a pressure inlet, 166. A piston member, 168, is moveably positioned within the chamber, 164, and incorporates a piston seal, 170, which establishes sealing engagement with the cylindrical wall of the piston chamber. The piston defines an upper extension, 172, which is sealed by an O-ring, 174, and further forms a lower extension, 176, which extends from the piston chamber through an opening and into the chamber within which the resilient sealing body is located. Upon downward movement of the piston responsive to pressure introduced through the pressure inlet port, 166, the lower extension, 176, of the piston also moves downwardly and displaces the resilient material of the resilient sealing body. A piston retainer plug, 178, is threadedly received by the upper retaining body half, 122, and forms a stop for the upper extremity of the piston extension, 172. Installation of the upper and lower retaining body halves to the wireline valve body will occur with the piston retainer plug, 178, backed out sufficiently to allow the piston 176 to retract into the chamber 126. After the slotted union nut has been tightened to secure the upper and lower retaining body halves to the upper extremity of the wireline valve body, hydraulic pressure will be applied to force the piston 176 into the resilient material 118 causing displacement of the sealing material and thus forcing the sealing material tightly against all metal surfaces including the cable 20. The piston retainer plug will be tightened to the position shown in FIG. 4, thus preventing the piston 176 from retracting should the hydraulic fluid pressure leak. Thereafter, well pressure within the passage 18 of the the wireline valve body will not leak past the resilient sealing body halves, 118 and 120, due to the stress in the sealing body. It should be borne in mind that the pressurized hydraulic fluid supply for introduction of pressure into the inlet passage, 166, may conveniently take the form of a hydraulic supply line which is threadedly or otherwise attached to the upper retaining body half, 122. Referring now to FIG. 6, a further modified embodiment of the present invention is disclosed generally at 180 of FIG. 6 which is a fragmentary sectional view of an auxiliary pressure packoff mechanism which differs from that of FIGS. 4 and 5 only in the manner of seal displacement. An upper retaining body half, 182, forms a receptacle, 184, having a piston member, 186, received in moveable engagement therein. A piston retaining screw or bolt, 188, extends through an internally threaded passage, 190, of the retaining body half, 182, and is disposed in retaining engagement with the piston member, 186. As the bolt or screw, 188, is rotated manually by means of a wrench, the piston member, 186, is driven downwardly into displacing relationship with the material forming the resilient sealing body, 192. Displacement of the resilient sealing body in this manner causes the resilient sealing body to become sufficiently stressed to establish an internal seal against the wireline valve body and the wireline. The upper retaining body half, 182, will typically be installed with the piston member, 186, at its uppermost position such that little or no seal displacement will occur as the upper retaining body halves are installed. Thereafter, the screw, 188, will be rotated, thus jacking the piston member, 186, downwardly into displacing relation with the resilient sealing material. This causes the sealing material to flow and fill the cracks and then further becoming compressed to a sufficient degree of stress to establish initial sealing against the internal surfaces of the wireline valve body and the external surface of the cable. The resilient sealing material will be subjected to the same stress throughout its body. It is well known that when resilient sealing material such as rubber is in contact with the sealing surfaces and is stressed above the level of the pressure to be sealed, a seal is effected. The resilient sealing material is of sufficient strength to resist flowing through the small cracks between the two halves of the upper or lower retaining body, around the pistons, or the union sealing surfaces.

Each of the three embodiments disclosed herein is provided with a vent system extending from the area below the auxiliary sealing device to the upper section of the assembly. The vent tube is sealed by the resilient sealing material. The venting system may be connected to a suitable hose, valve, gauge or any combination thereof. Pressure can be observed, captured, or vented as desired. Each of the devices is fitted with a means to clamp the cable to a stationary part of the device. The cable is placed between surfaces that closely match the cable diameter. The surfaces are clamped together using bolts from one side of the clamp to the other. The friction forces developed will hold the cable in place. After the cable repair is completed and there is determined to be no wireline valve leak, the auxiliary sealing device can be disassembled and removed. Should the wireline valve develop a leak, that leak can be effectively repaired while the auxiliary pressure packoff mechanism is in place and protecting the workmen against any hazards of leaked pressure. It is therefore seen that this invention is one well adapted to attain all of the objective and advantages hereinabove set forth, together with other advantages which are obvious and inherent from the description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in a limiting sense.

What is claimed is:

1. An auxiliary pressure packoff assembly for wireline control equipment having a wireline valve forming an outlet passage, comprising:
   (a) lower retaining body means being positionable within said outlet passage of said wireline valve and being positionable about the wireline extending through said outlet passage;
   (b) upper retaining body means being positionable about said wireline in spaced relation with said lower retaining body means and forming a closure for said outlet passage of said wireline valve, said upper retaining body means, lower retaining wireline valve, said upper retaining body means, lower retaining body means and said wireline valve body cooperating to define a packing chamber within said outlet passage of said wireline valve, said upper retaining body means having clamp means for securing said wireline in fixed relation therewith;
   (c) resilient sealing body means being positionable about said wireline and substantially filling said packing chamber;
   (d) sealing body deforming means being interconnected with said upper retaining body means and being movable relative thereto for mechanically deforming said resilient sealing body means and developing a seal thereof with said wireline valve means and said wireline, said resilient sealing body being further deformed by well pressure acting thereon for pressure enhanced sealing, said lower retaining body, upper retaining body and said resilient sealing means are each in the form of two half segments capable of positioning about said wireline in such manner that the wireline extends substantially centrally therethrough;
   (e) means retaining said upper retaining body means in positive assembly with said wireline valve body means; and
   (f) vent means communicating well pressure through said upper and lower retaining body means and said resilient sealing body means.

2. An auxiliary pressure packoff assembly as recited in claim 1, wherein:
   (a) said sealing body deforming means forms a piston receptacle means in each half segment of said sealing body means; and
   (b) a pair of piston elements have a portion thereof movably disposed within respective piston receptacle means and cooperate therewith to deform said sealing body means and establish a seal between said sealing body means and said wireline valve to define unbalanced areas of said sealing body, well pressure acting on one of said unbalanced areas developing a self-energizing seal of sufficient magnitude to contain said well pressure.

3. An auxiliary pressure packoff assembly as recited in claim 2, wherein:
   said piston receptacle means and said piston means are exposed to atmospheric pressure, said well pressure acting on one of said unbalanced areas of said sealing body and atmospheric pressure acting on the opposite unbalanced area thus developing a sealing stress in said sealing body exceeding well pressure.

4. An auxiliary pressure packoff assembly as recited in claim 1, wherein said sealing body deforming means comprises:

(a) a displacement element being movably retained by each body segment of said upper retaining body; and
   (b) means controllable externally of said upper retaining body for imparting displacement movement of said displacement element into said sealing body for increasing the internal compressive stress thereof and causing seal enhancement of said resilient sealing means with said wireline and said outlet passage of said wireline valve.

5. An auxiliary pressure packoff assembly as recited in claim 4, wherein said externally controllable means comprises:
   a jack screw mechanism having jacking relation with said displacement element to impart controlled linear movement to said displacement element against said resilient sealing body means for displacement of the resilient material thereof.

6. An auxiliary pressure packoff assembly as recited in claim 5, wherein:
   (a) said upper retaining body means forms an elongated piston receptacle;
   (b) a piston member forming said displacement element is movably received within said piston receptacle and is in driven relation with said jack screw; and
   (c) said jack screw extends through said upper retaining body means and defines a bolt head for externally controlled movement of said piston member.

7. An auxiliary pressure packoff assembly as recited in claim 1, wherein said sealing body deforming means comprises:
   (a) a pair of tension elements extending in fixed relation from respective segments of said lower retaining body means and being in movable relation with respective segments of said upper retaining body means; and
   (b) operator means extending through respective segments of said upper retaining body means and operatively engaging respective ones of said tension elements, at least a part of said operator means being exposed externally of said upper retaining body means and adapted for manual actuation to develop compressive force of said lower retaining body means against said resilient sealing body means and urging said sealing body means against said upper retaining body means with sufficient force to displace said sealing body means and establish sealing thereof with said wireline and wireline valve.

8. An auxiliary pressure packoff assembly as recited in claim 7, wherein:
   said operator means is bolt means extending through said upper retaining body means and having threaded engagement with said tension elements.

9. An auxiliary pressure packoff assembly as recited in claim 1, wherein said sealing body deforming means comprises:
   mechanical operator means interconnected with said lower retaining body means and being externally exposed for manipulation thereof to induce compressive movement of said lower retaining body against said resilient sealing body means and thus induce enhanced sealing engagement thereof with said wireline valve and wireline.

10. An auxiliary pressure packoff assembly as recited in claim 7, wherein:

said tension elements and said resilient sealing body are exposed to the atmosphere at the outer extremity thereof and said resilient sealing body is exposed to well pressure at the inner extremity thereof thereby permitting pressure induced stress of said sealing body to exceed well pressure and thus rendering said packoff assembly self-energizing responsive to well pressure.

11. An auxiliary pressure packoff assembly as recited in claim 4, wherein said externally controllable means comprises:
   (a) a hydraulic cylinder being defined by said upper retaining body means;
   (b) piston means being moveably contained within said hydraulic cylinder and having said displacement element extending therefrom; and
   (c) pressure inlet means being in communication with said hydraulic cylinder and receiving a pressurized hydraulic medium which acts on said piston means to impart displacing movement of said displacement element thereof against said resilient sealing body means.

12. An auxiliary pressure packoff assembly as recited in claim 1, wherein:
   said resilient sealing body is mechanically displaced to form an initial seal with said wireline valve and wireline and is further displaceable by well pressure acting thereon for pressure enhanced sealing.

13. An auxiliary pressure packoff assembly for sealing the outlet passage of a wireline valve having a valve chamber and having a wireline extending therethrough, comprising:
   (a) resilient sealing body means in the form of two half segments being positionable about said wireline and being further positionable within said outlet passage of said wireline valve, said half segments cooperating to form a wireline passage receiving said wireline therein;
   (b) upper and lower seal retainers each formed by half retainer segments retaining said resilient sealing body therebetween, securing said resilient sealing body means within said outlet passage and forming openings receiving said wireline, said upper seal retainer having clamp means for securing said wireline in fixed relation therewith;
   (c) means inducing mechanical displacement of said resilient sealing body means for development of a seal within said outlet passage of said wireline valve and with said wireline;
   (d) means forming first and second differential areas of said resilient sealing body means, well pressure acting on said first differential area and atmospheric pressure acting on said second differential area cooperatively developing sealing stress in said sealing body exceeding well pressure and thus rendering said sealing body self-energizing responsive to well pressure; and
   (e) vent means communicating well pressure through said upper and lower seal retainers and said resilient sealing body means.

14. An auxiliary pressure packoff assembly as recited in claim 13, wherein:
   vent passage means extends through said resilient sealing body means and said upper seal retainer for conducting pressure from said outlet passage upstream of said resilient sealing body means to a remote location.

15. An auxiliary pressure packoff assembly as recited in claim 13, wherein:
   (a) a vent tube extends through one of said half-sections of said resilient sealing body means;
   (b) vent conduit means is in communication with said vent tube and extends to a remote location for safe venting of pressure upstream of said resilient sealing body means; and
   (c) said displacement of said resilient sealing body means also establishes a seal thereof with said vent tube means.

16. An auxiliary pressure packoff assembly as recited in claim 13, wherein said mechanical displacement means comprises:
   means interconnected with said upper and lower seal retainers for mechanically reducing the axial length of said resilient sealing body means and causing consequent compressive stressing of the resilient material thereof against all surfaces in contact therewith for development of an initial mechanically induced seal.

17. An auxiliary pressure packoff assembly as recited in claim 16 wherein said mechanical displacement means comprises:
   tension means extending through said sealing body and cooperating therewith to form differential sealing body areas sensing well pressure and atmospheric pressure, well pressure acting on one of said differential sealing body areas and developing pressure induced stress in said sealing body exceeding well pressure.

18. An auxiliary pressure packoff assembly as recited in claim 13 wherein said mechanical displacement means comprises:
   (a) piston means being movably supported by at least one of said upper and lower retaining body means and disposed for contact with said resilient sealing body means; and
   (b) means operated externally of said auxiliary pressure packoff assembly for forcing said piston means into material displacing interengagement with said resilient sealing body means and inducing compressive sealing thereof with all surfaces in contact therewith.

19. An auxiliary pressure packoff assembly as recited in claim 18, wherein:
   said piston means is mechanically driven.

20. An auxiliary pressure packoff assembly as recited in claim 18, wherein:
   said piston means is hydraulically driven.

21. An auxiliary pressure packoff assembly as recited in claim 13, including:
   means for clamping said wireline to said upper retaining body means prevent movement thereof when said packoff assembly is sealed.

22. An auxiliary pressure packoff assembly for wireline control equipment having a wireline valve having surfaces forming an outlet passage and having a wireline extending centrally through the wireline valve and outlet passage, comprising:
   (a) a resilient sealing body formed of two half sealing body segments and being positionable within said outlet passage and forming surface means in intimate engagement with the surfaces forming said outlet passage, said sealing body forming wireline passage means extending therethrough and having abutting seal surfaces intersecting said wireline passage means and forming wireline receiving means for positioning of said sealing body with said wireline extending through said wireline passage means;

(b) upper and lower seal retainer elements each being in the form of half retainer segments securing said resilient sealing body within said outlet passage and cooperatively forming wireline openings, said upper seal retainer element having clamp means for securing said wireline in fixed relation therewith;

(c) piston means being movable relative to at least one of said upper and lower seal retainer elements and being selectively movable for displacement of the material of said resilient sealing body for selectively placing said resilient sealing body under sufficient mechanical stress to develop initial sealing of said sealing body with respect to said wireline passage means and wireline;

(d) means forming first and second differential areas of said resilient sealing body and being responsive to well pressure acting on said first differential area and said resilient sealing body and atmospheric pressure acting on said second differential area for cooperatively developing sealing stress of said resilient sealing body exceeding well pressure;

(e) vent means communicating well pressure through said upper and lower seal retainer elements and said resilient sealing body.

* * * * *